United States Patent [19]
Kawagoe et al.

[11] Patent Number: 4,735,526
[45] Date of Patent: Apr. 5, 1988

[54] METHOD FOR INSTALLING OFFSHORE JACK-UP STRUCTURES

[75] Inventors: Akira Kawagoe, Tokyo; Jun Akiyama, Yokohama; Hiromitsu Tateishi, Tokyo, all of Japan

[73] Assignee: 501 Mitsui Ocean Development & Engineering Co., Tokyo, Japan

[21] Appl. No.: 910,934

[22] Filed: Sep. 24, 1986

[51] Int. Cl.$^4$ .............................................. E02B 17/08
[52] U.S. Cl. ................................... 405/196; 405/203; 405/224; 405/226
[58] Field of Search ............... 405/169, 188, 190, 191, 405/195, 196–200, 203, 204, 211, 224, 226

[56] References Cited

U.S. PATENT DOCUMENTS

| | | | |
|---|---|---|---|
| 3,413,946 | 12/1968 | Von Schultz | 405/200 X |
| 4,214,842 | 7/1980 | Franks | 405/191 |
| 4,426,173 | 1/1984 | Richart et al. | 405/204 X |
| 4,505,615 | 3/1985 | Evans | 405/196 |
| 4,591,293 | 5/1986 | Levallois et al. | 405/169 X |

Primary Examiner—David H. Corbin
Attorney, Agent, or Firm—Bierman and Muserlian

[57] ABSTRACT

A method for installing an offshore jack-up structure having a buoyant platform to be towed and a plurality of legs, the method comprising the steps of:
(a) providing a pair of ultrasonic transmitter-receivers on a longitudinal and horizontal center line of the platform,
(b) providing of ultrasonic transmitters on a longitudinal and horizontal center line of a target structure to which the rig is approached; and
(c) receiving signals transmitted from the ultrasonic transmitters of the target structure by the ultrasonic transmitter-receivers of the platform to determine a relative distance between the rig and the target structure.

11 Claims, 15 Drawing Sheets

METHOD FOR INSTALLING OFFSHORE JACK-UP STRUCTURES

BACKGROUND OF THE INVENTION

1. Field of the Invention

This invention relates to a method for installing an offshore jack-up drilling structure, more particularly to a method for installing and operating an offshore jack-up drilling rig at a desired offshore location, and to countermeasure for minimizing the occurence of punch-through accidents during preload opration.

2. Description of the Prior Art

In general, an offshore jack-up structure or rig consists of a buoyant platform and a plurality of movable legs and such type has been widely used for offshore operations, such as drilling and completing under water oil and gas wells. In the condition in which the movable legs are fully raised up, the buoyant platform is towed to a desired location, then the legs are lowered by a jacking system so that the platform is supported on the sea floor. Finally the platform is raised above the surface of a body of water for operations. For the purpose of raising or lowering the legs of the platform, a "rack and pinion type" jacking system is widely used. The jacking system of this type includes at least one elongated rack which is mounted vertically on the exterior side surface of the upright legs and extends substantially through the entire length of the same, and a plurality of cooperating pinions engaged with each of the racks. Each of the pinions is driven through a series of reduction gears by means of a respective electric motor.

It is required to position the rig at a desired offshore location and then the raised legs with a footing are lowered down to contact with the sea floor. After pumping water into water tanks provided in the buoyant platform so as to apply preload to the jack-up rig for driving the footing of the leg into a substantial depth in the ground beneath the sea floor, the platform is raised to a suitable elevation above the surface of a body of water.

During this preload operation it is reported that a number of accidents have been occured due to the rig inclination by unexpected penetration, viz.punch-through, of the legs into the sea floor. Particularly, the recent trend toward heavier jack-up rigs being built to cope with deeper and harsh seas of operation calls for effective countermeasures against such sudden penetration (punch-through) of jack-up rig legs.

When a pre-installed production assembly, hereafter referred to as a "target structure", is in want of repair by using the rig, old footprints of the legs would be left on the sea floor. If the legs are lowered down at the vicinity of the old footprints again, an unexpected trouble will be happened.

Consequently, it is necessary to carry on investigation of configuration of the ground, the nature of the soil of the ground beneath the sea floor or the depth of water.

In addition to the above, the following data will be requested for installing and operating the rig:

(1) the draft of the platform;
(2) the depth of water in taking consideration of a tide level or an average wave height into account;
(3) the distance between the lower end of the footing and a refrence level of the surface of a body of water during the installation of the rig;
(4) the distance between the lower end of the footing driven or penetrated into the ground beneath the sea floor and a reference level of the surface of a body of water;
(5) the rate of subsidence of the leg per unit time of about 30 seconds;
(6) an angle of inclination of the surface of the sea floor;
(7) an angle of inclination of the platform supported by the legs on the sea floor;
(8) operation of jacking mechanisms;
(9) a height of the leg from the deck of the platform;
(10) the direction and speed of the wind;
(11) the direction of the tide;
(12) the height of the wave;
(13) weight with load applied to the rig by pumping water into water tanks in the platform;
(14) load to be applied to each of the legs;
(15) the length of a cantilever extending from the platform; and
(16) the distance between the surface of the sea floor and the lower end of the leg or footing to be penetrated into the ground beneath the sea floor.

OBJECTS OF THE INVENTION

In view of the foregoing, it is the main object of the present invention to provide a method for installing the offshore jack-up rig to insure the safety of operations.

It is another object of the present invention to provide a method for installing the offshore jack-up rig by displaying necessary data to be used for controlling the operation of the rig on the surface of cathode-ray tubes in picture.

It is an object of the present invention to provide a method for installing the offshore jack-up rig without polluting the sea.

It is a still further object of the present invention to provide a method for installing the offshore structure for driving or penetrating the leg into the ground beneath the sea floor to support securely the rig.

BRIEF DESCRIPTION OF THE DRAWINGS

The above mentioned and other features of the present invention are more fully set forth in the following detailed description of the presently preferred embodiment carrying out the method of this invention; such description is set forth with reference to the accompanying drawings, in which

FIG. 20-1 and FIG. 20-2 are a block diagram showing a certain sequenced relation between the various procedural steps according to the present invention;

DESCRIPTION OF THE ILLUSTRATED EMBODIMENT

Figure 1:
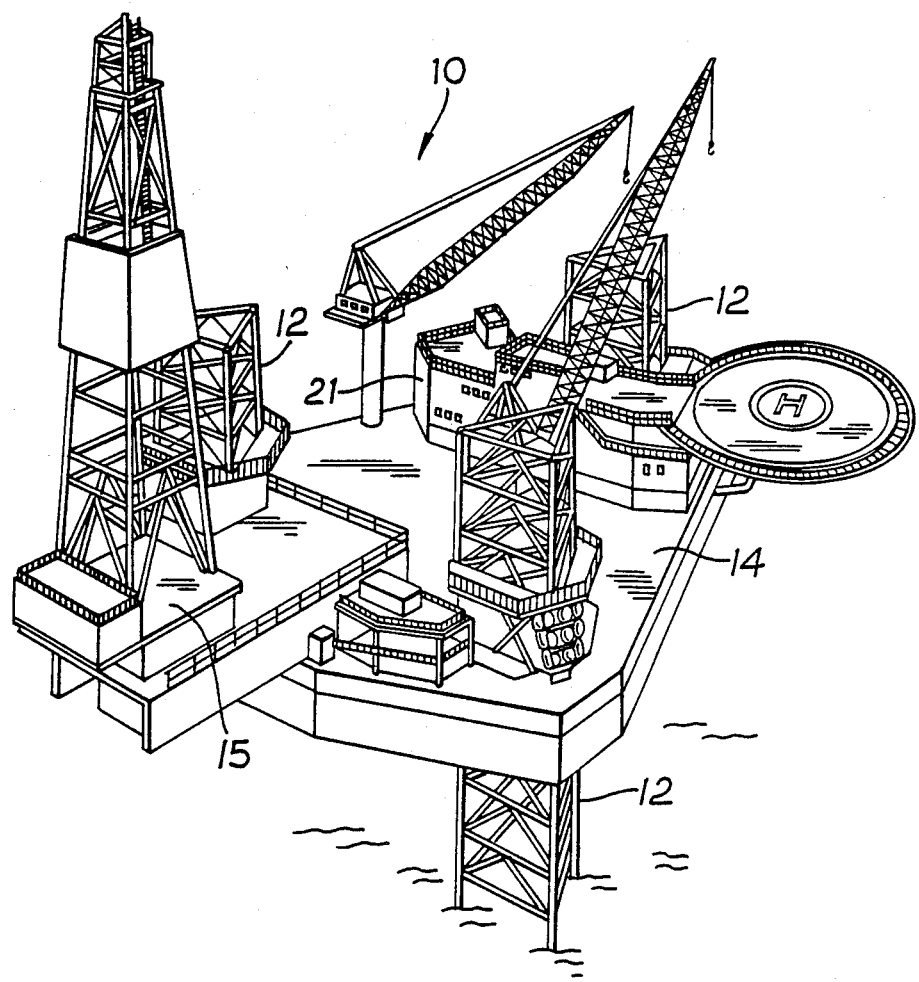
FIG. 1 is a perspective view of an offshore jack-up rig.

Referring now to FIG. 1 of the drawings, there is shown an offshore jack-up drilling rig 10 having at least three upright legs 12 extending through a buoyant platform 14 vertically and each of legs 12 is raised or lowered by a jacking system. The rig has a drill floor 15 with a derick mast where drilling and comleting works are carried. The buoyant platform may be towed to a desired offshore working location by means of, for example, a boat or boats. When the rig 10 is positioned at a desired offshore working location, the legs are lowered down into a body of water so that a footing of each of the legs can be contacted with the sea floor, and the platform 14 is then raised up to a sufficient height above the surface of a body of water so as to minimize the effect of tide and waves.

In the above-mentioned operation, it is a very important to locate the rig 10 at a desired position such as the vicinity of a target structure such as, for example, a pre-installed gravity structure 18.

Figure 3:
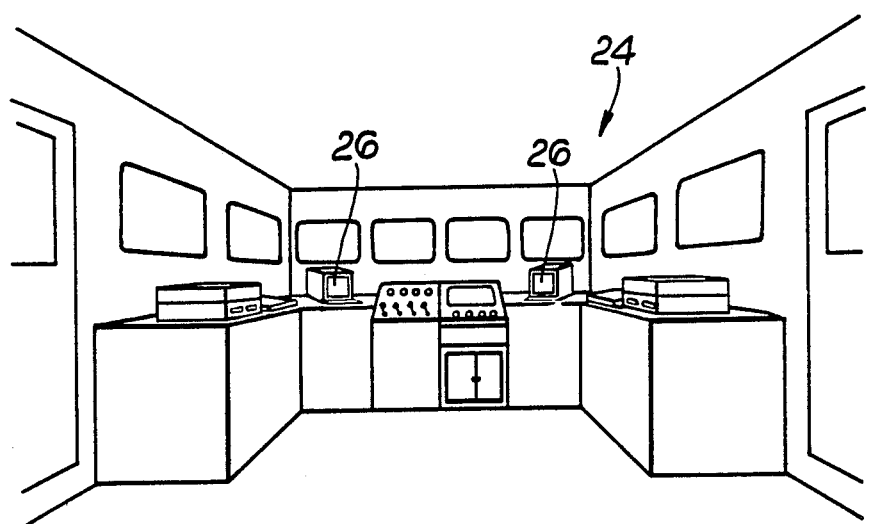
FIG. 3 is a schematic illustration showing the interior of a control chamber on the platform.

To this end, according to the method of the present invention, as shown in FIG. 3, necessary data for installing the rig can be displayed on cathode-ray tubes 26 of process control and data process instruments arranged in a control chamber 24 on the platform 14.

Figure 4:
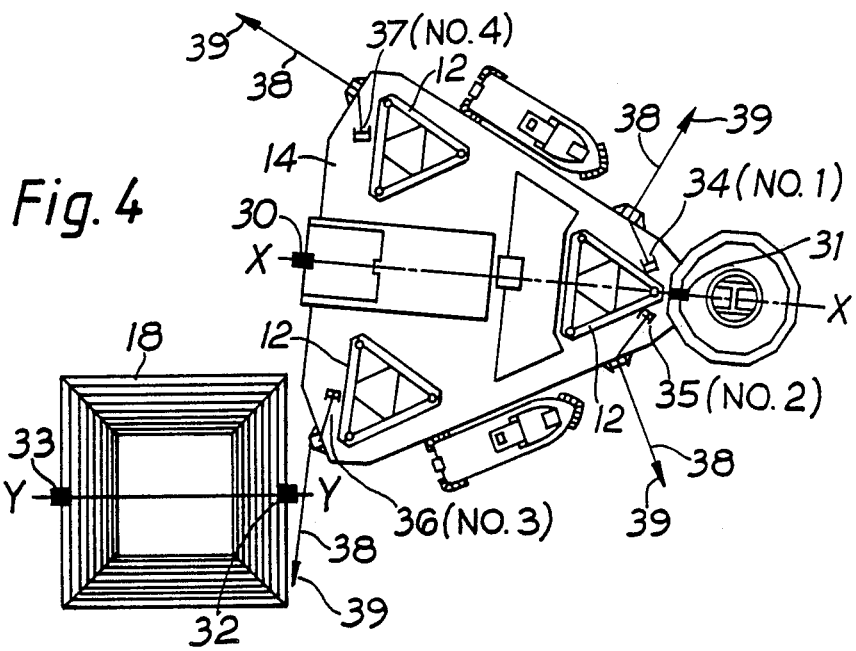
FIG. 4 is a schematic plan view showing the offshore jack-up rig and a pre-installed target structure.

In order to decide a reference line of the rig 10, a pair of ultrasonic transmitter-receivers 30 and 31 are respectively mounted on at each end of a horizontal and longitudinal axis X—X passing through a center of the rig 10, as shown in FIG. 4.

On the other hand, a pair of ultrasonic transmitters 32 and 33 are respectively arranged at each end of a horizontal and longitudinal axis Y—Y passing through a center of the target structure 18.

By means of these ultrasonic transmitter-receivers 30 and 31 and transmitters 32 and 33, the reference position between the axis X—X of the rig 10 and the axis Y—Y of the target structure 18 can be plotted to determine the distance A between the transmitter-receiver 30 of the end of the rig 10 and the transmitter 32 of the target structure 18 on the extension of the axis X—X. These data can be displayed on the cathode-ray tube 26 in picture, as shown in FIG. 5.

By other means of theoretical calculation, ultrasonic transmiter-receivers 30 and 31, and the transmitter 32 can figure out geometrically the relative location of the rig and the target sructure without the transmitter 33.

For the purpose of positioning the rig 10 to a desired location or at the vicinity of the pre-installed target structure 18 exactly, the platform 14 is provided with a plurality of winches 34, 35, 36 and 37. A cable or rope is wound around each of the winches 34, 35, 36 and 37 and an anchor 39 is secured to at an end of the rope or cable 38. When the rig 10 reaches to an appropriate position adjacent to the target structure 18, each anchor 39 will be lowered down on the sea floor and the rig 10 will be moved to a desired direction by adjusting or controlling the length of each cable 38.

Figure 5:
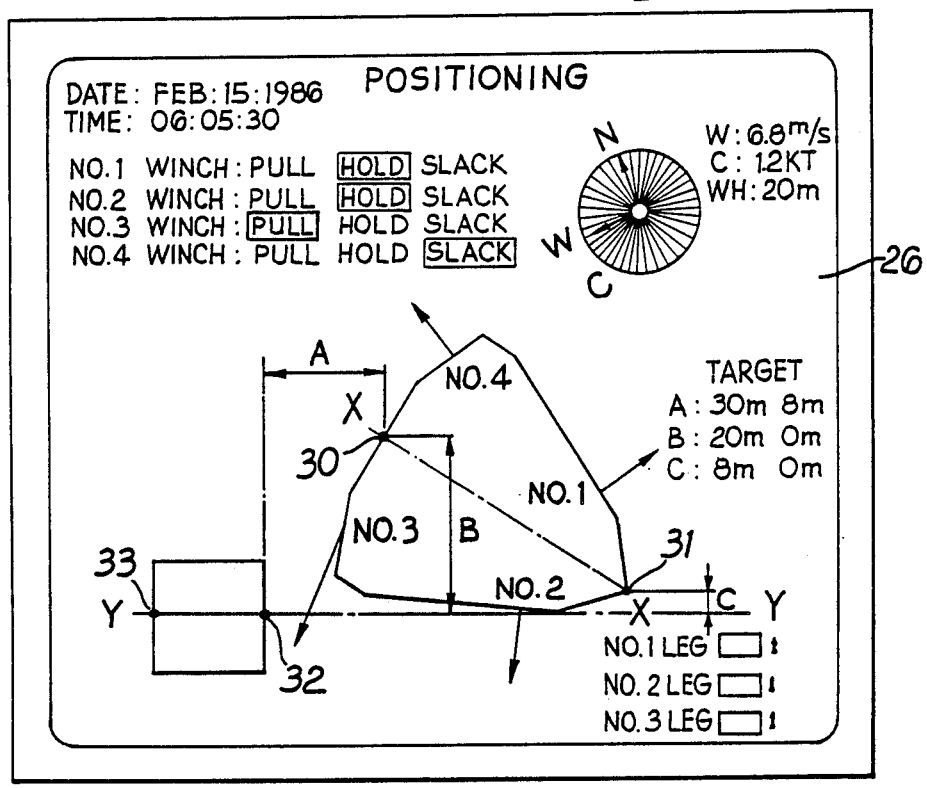
FIG. 5 is a schematic view of an example of the picture on a cathode-ray tube illustrating the relative position of the offshore jack-up rig and the pre-installed target structure.
Figure 6:
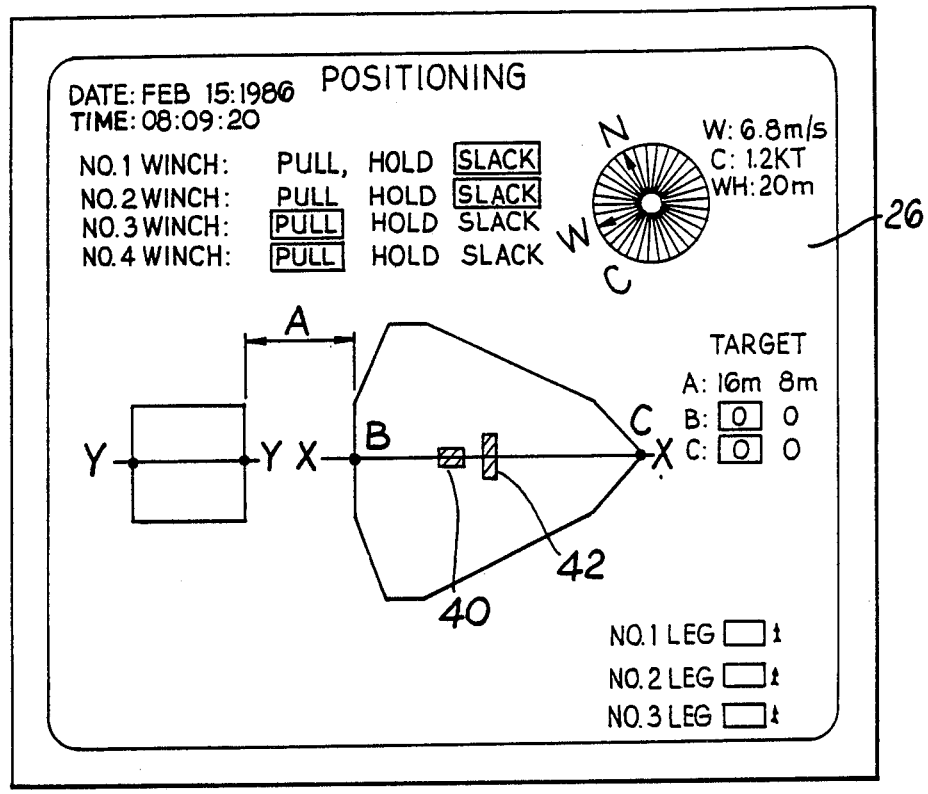
FIG. 6 is a schematic view of a picture displayed on the cathode-ray tube showing that the rig is exactly positioned to the target structure.

According to the relative position of the rig and the target structure 18, the length of the cable 38 to be adjusted by pulling, holding or slackening the winch can be calculated by a computer according to a prescribed program, and resultant data can be displayed on the surface of the cathode-ray tube, as shown in FIG. 5.

If necessary, the direction and speed of the wind (W: m/s), the speed of the tidal current (C: kt) and the height of the wave (WH: m) in the working location of the rig 10 can be displayed on the cathode-ray tube 26.

Figure 2:
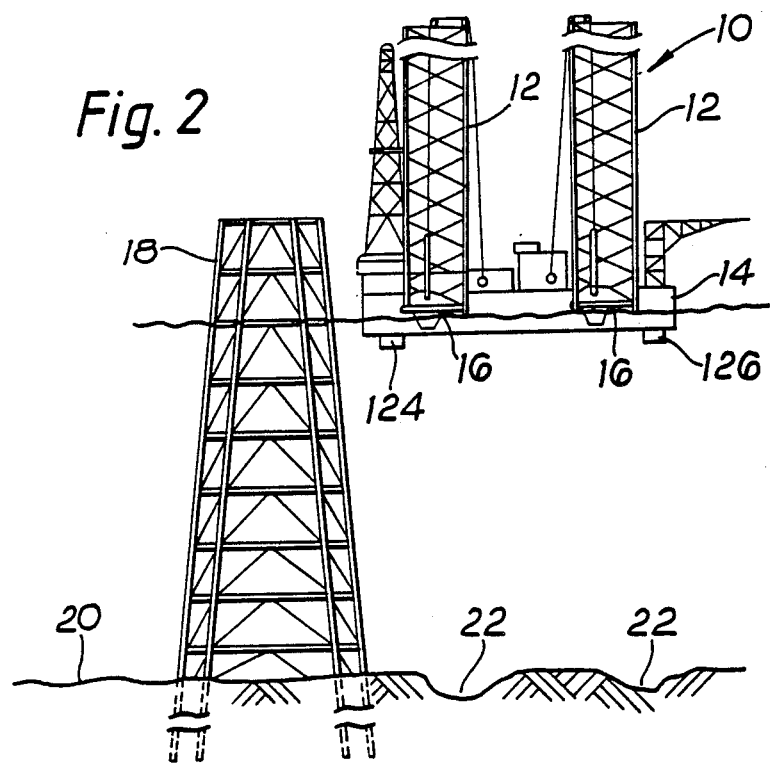
FIG. 2 is a schematic elevation of the offshore jack-up rig to be positioned to a target structure showing the relationship of the rig to the target structure.

When old footprints 22 of the legs 12 are left on the sea floor 20, as shown in FIG. 2, the footing 16 of each leg 12 must be lowered down so that the end of the leg may exactly fit to a corresponding footprint 22.

Figure 7:
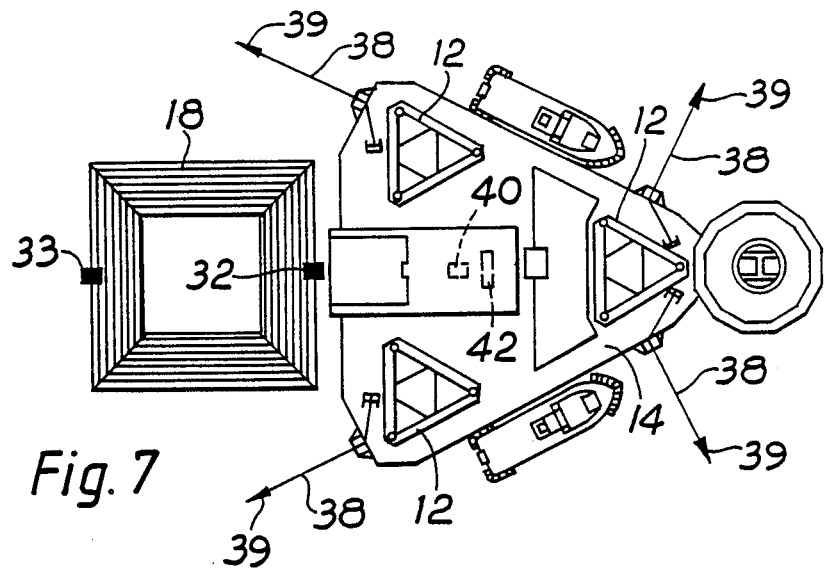
FIG. 7 is a schematic plan of the offshore jack-up rig which is exactly positioned to the target structure as shown in FIG. 6.

Then, a ultrasonic transmitter 40 is mounted on a longitudinal axis X—X passing through the center of the underside of the rig 10 and a ultrasonic receiver 42 is mounted on a line perpendicularly intersecting to the axis X—X, as shown in FIG. 7.

Figure 8:
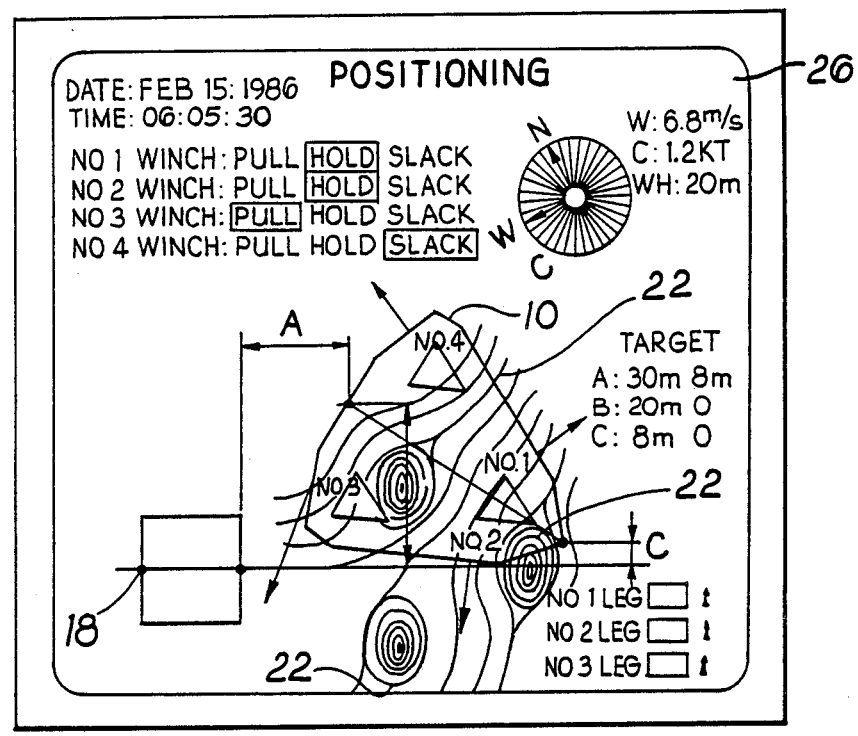
FIG. 8 is a schematic view of a picture displayed on the cathode-ray tube illustrating the configuration of the surface of the sea floor just under the leg.
Figure 9:
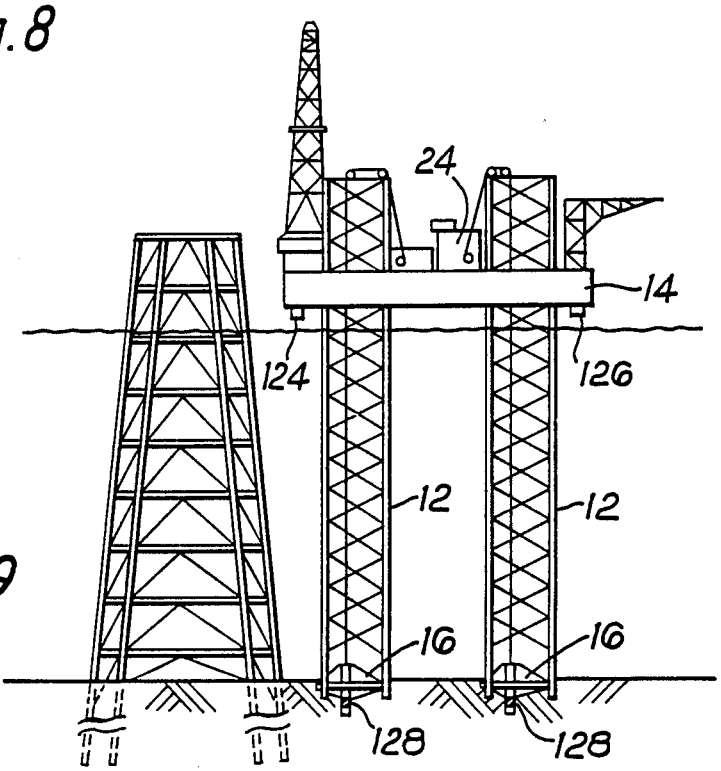
FIG. 9 is a schematic view of the rig supported by the legs on the sea floor.

When the rig 10 approaches to the vicinity of the target structure 18, the transmitter 40 will radiate beams to around the rig 10 and the receiver 42 will scan to receive the radiated beams. Thus, unevenness of the surface of the sea floor directly beneath the rig 10 can be displayed on the surface of the cathode-ray tube 26 in contour line, as shown in FIG. 8.

It is a very important not only to inspect the configuration of the sea floor on which the legs 12 are lowered down from the platform 14, but also to survey the nature of the ground beneath the sea floor for marine safety.

A ultrasonic transmitter 124 which may be scanned by means of electronic scanning device and a receiver 126 are respectively arranged at a rear end and a front end of the underside of the platform 14.

Figure 10:
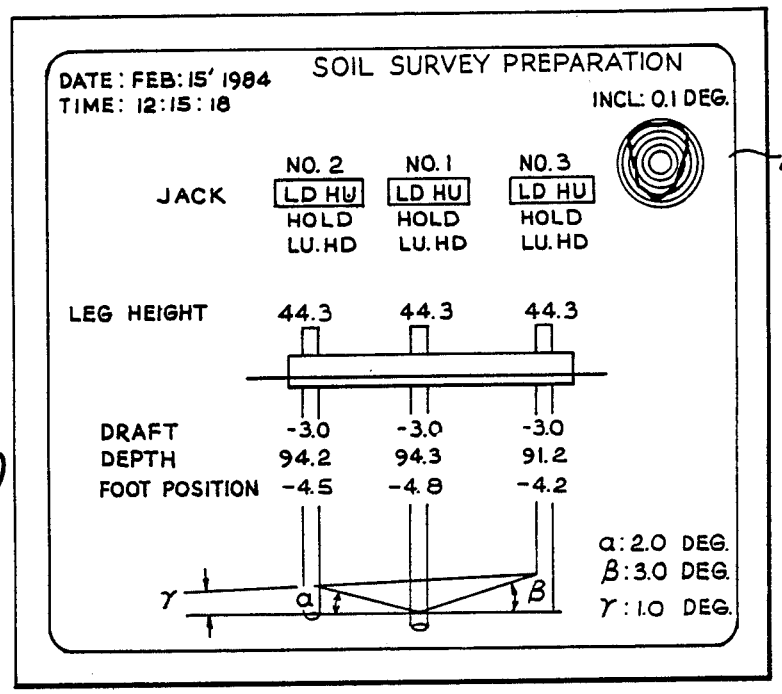
FIG. 10 is a schematic view of a picture of data obtained by means of submarine ultrasonic sensing apparatus on the cathode-ray tube.

A soil survey apparatus 128 is mounted on the footing 16. When the footing 16 is reached to the sea floor, the data obtained by the soil survey apparatus 128 is transmitted to the computer for displaying them on the cathode-ray tube 26 in picture. As shown in FIG. 10, the configuration of the sea floor inspected by the soil survey apparatus 128 will be given in terms of an angle of inclination a, b or c.

Figure 12:
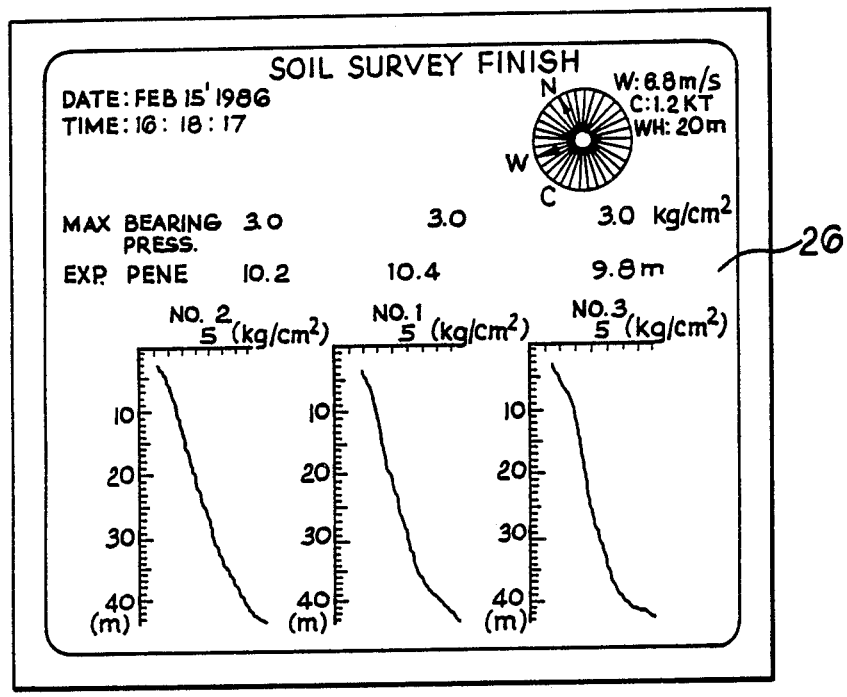
FIG. 12 is a schematic view of a picture at the finish of the soil survey.

When the footing is driven into the ground beneath the sea floor, the depth of the penetration (EXP. PEN) which will be decided by the nature of the soil can be displayed on the cathode-ray tube 26. At the same time, necessary data such as, for example, relations between the resistance of the soil and the depth of the footing in the ground can be given on the cathode-ray tube 26. In addition to the above data, a maximum surface pressure applied to the footing 16, namely, the quotient (MAX BEARING PRESS) of the weight to be born by the footing 16 divided by the surface area of the footing 16 will be calculated and displayed on the cathode-ray tube 26, as shown in FIG. 12. From these data, it is possible to determine the preload to be applied to the rig 10.

Figure 13:
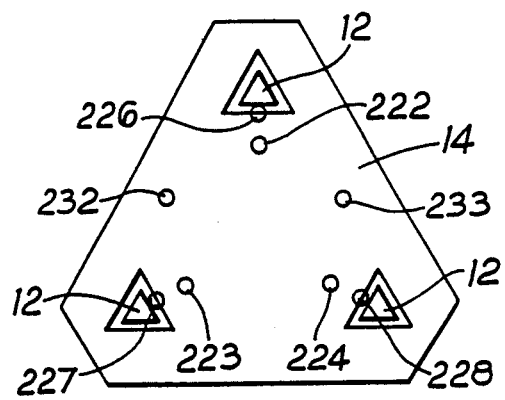
FIG. 13 and FIG. 14 are respectively a schematic side elevation and plan view of the jack-up rig showing the relative arrangement of ultrasonic sensors.
Figure 14:
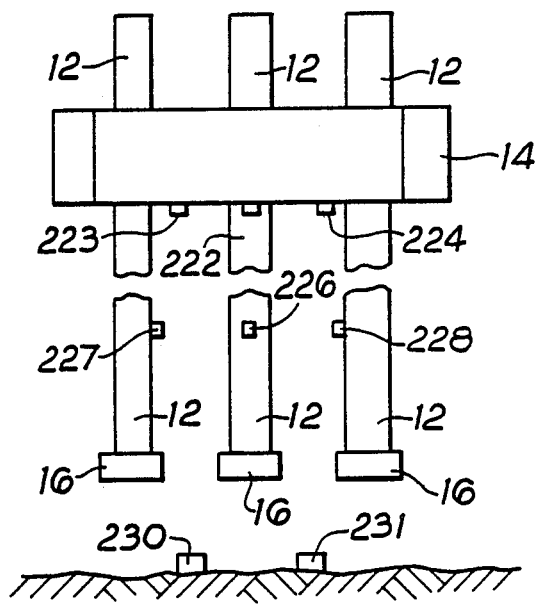

As shown in FIGS. 13 and 14, ultrasonic transmitter-receivers 222, 223 and 224 are respectively provided on the outer wall of the platform 14 adjacent to each of the legs 12.

Further, the first, second and third submersible receivers 226, 227 and 228 are respectively arranged on the legs 12 to move with each of the legs 12.

Figure 15:
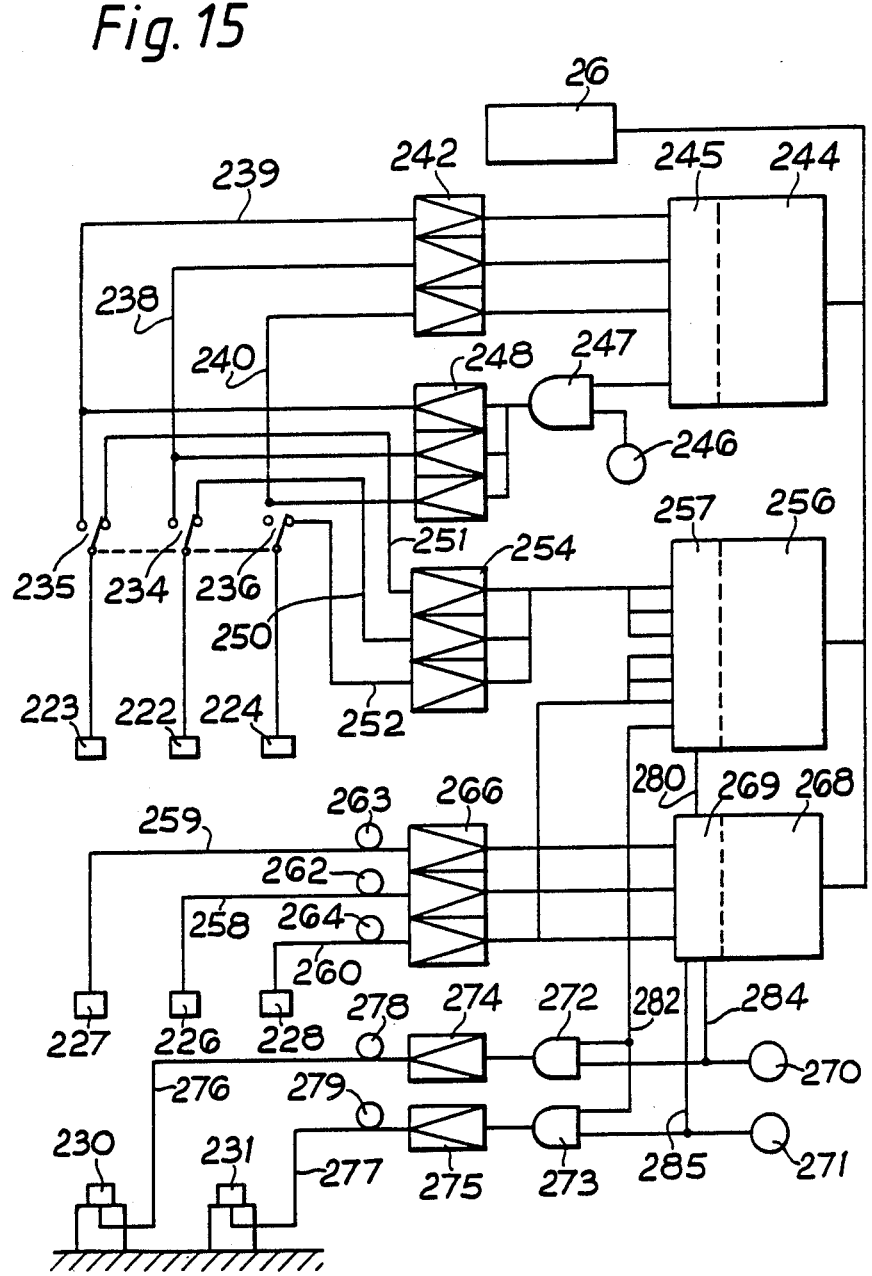
FIG. 15 is a block diagram of an electrical circuit of the sensors.

The submarine transmitters 230 and 231 are lowered down from the platform 14 to on the sea floor by, for example, the deck crane on the platform 14. The number of this submarine transmitter is enough to be one in view of theoretical function described hereinafter. In this description two submarine transmitters are shown for safety operation. FIG. 15 is a block diagram showing the relative arrangement of the transmitter-receivers 222, 223 an 224; the submersible receivers 226, 227 and 228 and the submarine transmitters 230 and 231.

The ultrasonic transmitter-receivers 222, 223 and 224 radiate ultrasonic pulse waves to the surface of the ocean floor and then the wave reflected from the surface of the sea floor can be received by the transmitter-receivers 222, 223 and 224. These transmitter-receivers 222, 223 and 224 can also receive ultrasonic waves radiated from the submarine transmitters 230 and 231, respectively. To this end, the transmitter-receivers 222, 223 and 224 are respectively connected through duplexers 234, 235 an 236, lines 238, 239 and 240, and an amplifier 242 with an interface 245 of a computer 244 for receiving the self-radiated pulses. A signal generator 246 is connected through a gate 247 and an amplifier 248 to lines 238, 239 and 240 for radiating pulse from the transmitter-receivers 222, 223 and 224.

Further the transmitter-receivers 222, 223 and 224 are respectively connected through lines 250, 251 and 252 with an amplifier 254 of the received signal and the output from which is transmitted to an interface 257 of a computer 256.

The submersible ultrasonic receivers 226, 227 and 228 are respectively secured to a suitable position of each of the legs 12. The lines or cables 258, 259 and 260 of the receivers 226, 227 and 228 are moved up or down by means of the respective winches 262, 263 and 264. The cables 258, 259 and 260 are respectively connected through an amplifier 266 to an interface 257 of the computer 256 and an interface 269 of a computer 268. The submarine ultrasonic transmitters 230 and 231 are respectively connected through respective generators 270 and 271, gates 272 and 273 and amplifiers 274 and 275 to lines or cables 276 and 277. The cables 276 and 277 can also be moved up or down by means of the respective winches 278 and 279.

The interface 257 of the computer 256 by means of line 280, the interface 257 and the gates 272 and 273 are connected by a line 282, and the interface 269 and the generators 270 and 271 are connected by lines 284 and 285 each other.

The pulse wave radiated from the submarine transmitter-receivers 230 or 231 is received by the transmitter-receivers 222, 223 and 224, and then a position coordinate with respect to the submarine ultrasonic transmitter 230 or 231 can be obtained by mean of the computer 256 according to a measuring principle of the response system. The resultant output can be given on the cathode-ray tube 26 as a picture.

The submersible ultrasonic receivers 226, 227 and 228 can be moved down together with the legs 14. When the receivers 226, 227 and 228 enter into the water, these receivers can receive the pulse wave radiated from the submarine transmitter 230 or 231. The computer 256 can operate to calculate the rate of the movement of each leg 12 on the basis of the position coordinate of the submarine transmitters 222, 223 and 224, and then the resultant data will be displayed on the cathode-ray tube 22.

When the footing 16 of each leg 12 is subsided into the ground beneath the sea floor, the pulse radiated from the submarine transmitter 230 or 231 can be compared with the pulse received by the submersible receivers 226, 227 and 228 by means of the computer 268 in phase so that the displacement of the leg 12 in the ground may be measured.

When the platform 14 is supported on the sea floor by means of the legs 12 with the footing 16, the platform 14 will be raised up to a desired height from the surface of a body of water. In this instance, the transmitter-receivers 222, 223 and 224 which are respectively arranged to the underside of the platform 14 radiate pulse wave to the surface of the water, and the reflected waves from the surface of the water are also received by these transmitter-receivers 222, 223 and 224. The distance between the underside of the platform 14 and the surface of the water can be calculated by the time of the ultrasonic wave transmitted from the transmitter-receivers 222,223 and 224 are received by them. These data can be displayed on the surface of the cathode-ray tube 26 in picture, as shown in FIG. 10. The transmitter-receivers 222, 223 and 224 will give in terms of an angle of inclination a, b or c.

Figure 16:
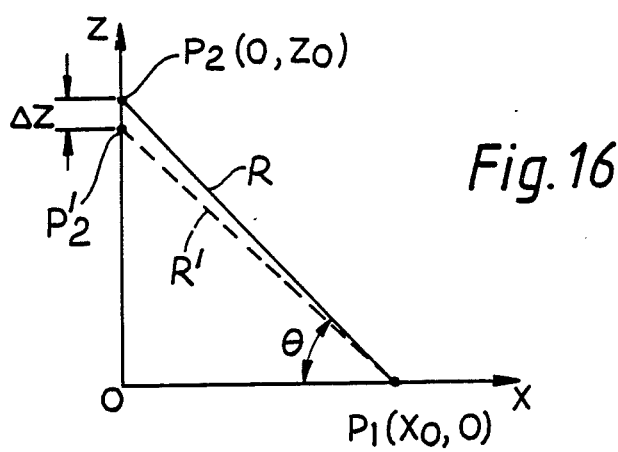
FIG. 16 through FIG. 18 are respectively a schematic diagram to explain the principle for measuring the rate of subsidence of the leg per unit time.

As shown in FIG. 16, when the ultrasonic pulse radiated from a sensor $P_1$ arranged on the sea floor (abscissa X) is received by a sensor $P_2$ mounted on the leg 12 (ordinate Z), the distance R between the sensors $P_1$ and $P_2$ can be determined by the time t of the propagation of pulse from the sensor $P_1$ to the sensor $P_2$. That is, $$R = ct \tag{1}$$

wherein c is the velocity of the ultrasonic sound in water.

From the coordinate of the above distance R and the sensor $P_1$, the coordinate of the sensor $P_2$ will be calculated as follows:

$$Z_0 = \sqrt{R^2 - X_0^2} \tag{2}$$

In this instance, if a pulse system is employed, accuracy of the measurement of the distance R will be limited to within about ±1% as the normal accuracy of the ultrasonic instruments. It is hard to obtain the more accurate change Z shown in FIG. 16 from the pulse system. Consequently, the system for detecting the phase difference is employed therefor.

Figure 17:
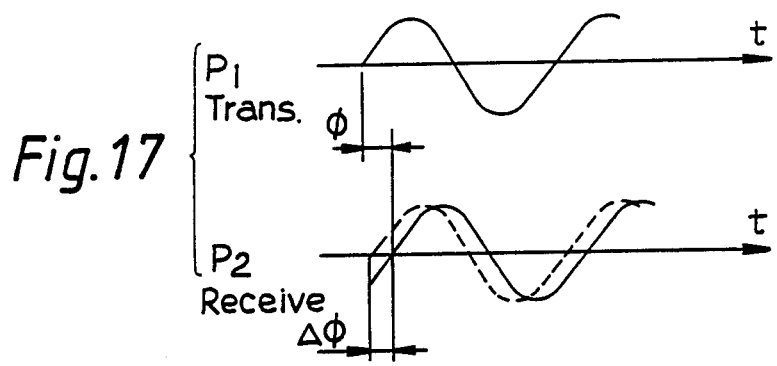

As shown in FIG. 17, the wave transmitted from the sensor $P_1$ is received by the sensor $P_2$ in phase delay $\phi$.

In FIG. 16, when the position of the sensor $P_2$ is lowered by $\Delta Z$, the wave form transmitted from $P_1$ will be received by the sensor $P_2$ in advance of $\Delta\phi$. It is possible to calculate the displacement of the sensor $P_2$ by detecting the values of varying quantities $\Delta\phi$.

In FIG. 16, the distance $R'$ between the first position $P_2$ and the last position $P'_2$ is:

$$\Delta R = R - R' \quad (3)$$

then, $$\Delta R = \frac{\lambda}{2\pi} \cdot \Delta\phi \quad (4)$$

wherein is the wave length of the ultrasonic wave in water, namely, $\lambda = c/f$. ($f$=frequency.)

The relation between $\Delta Z$ and $\Delta R$ is:

$$\Delta Z = \Delta R / \sin\theta \quad (5)$$

however, $$\sin\theta = Z_0/R \text{ or}$$

$$\sin\theta = Z_0 X_0 / \sqrt{X_0^2 + Z_0^2}$$

Therefore, from the equations (4) and (5), $$\Delta Z = \lambda/2\pi \sin\theta \cdot \Delta\phi \quad (6)$$
$$= \lambda \cdot R \cdot \Delta\phi/2\pi \cdot Z_0 \quad (7)$$

Figure 18:
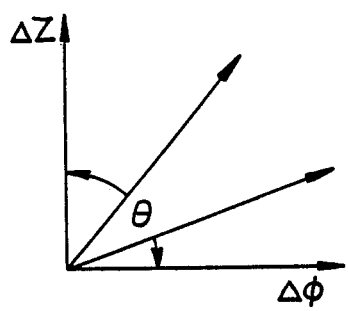
Figure 19:
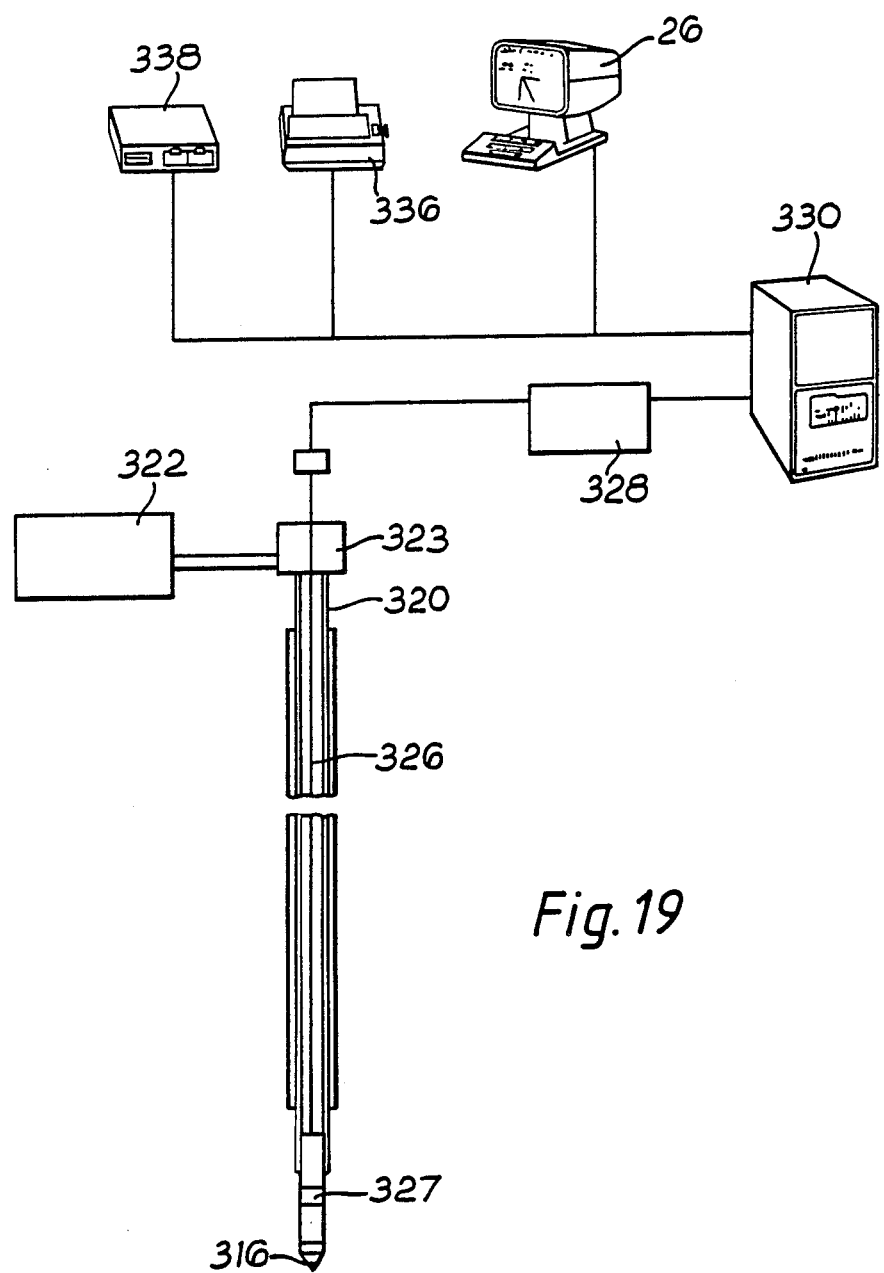
FIG. 19 is a schematic view of the apparatus for obtaining data from the group beneath the sea floor.

Thus, when angle $\theta$ is parameter, the relation between $\Delta\phi$ and $\Delta Z$ is as shown in FIG. 18.

As is clear from FIG. 18, if 0°–90°, namely, the sensor $P_1$ is positioned directly under the sensor $P_2$, the displacement of the sensor $P_2$ will be determined precisely. By this means of the phse difference detector, more accurate (less than ±0.1%) rate of subsidence of the legs 12 per unit time of about 30 seconds can be obtained.

To support the platform 14 on the sea floor firmly and certainly, it is essential to drive or penetrate the leg 12 so that the footing 16 of the leg 12 contacts with a strong enough soil stratum in the ground beneath the sea floor by applying preload to the rig 10.

For the purpose to investigate the soil structure and find th strong enough stratum, a tube 320 with a corer sensor 316 is lowered to and bored into the ocean floor by means of drivig unit 323. The corer sensor 316 is connected to an appropriate electronic device 327 by a cable 326 and information obtained by the corer sensor 316 is transferred to an electronic circuit and interface 328 and the information is processed in a computer 330 to display the processed data on the cathode-ray tube 26, or recording in a printer 336 or a video set 338.

The driving unit 323 will be installed on the deck of the buoyant platform 14, on the drill floor 15, on the leg 12, on the footing 16 or on the sea floor vicinity of the leg rest position.

Figures 1, 20:
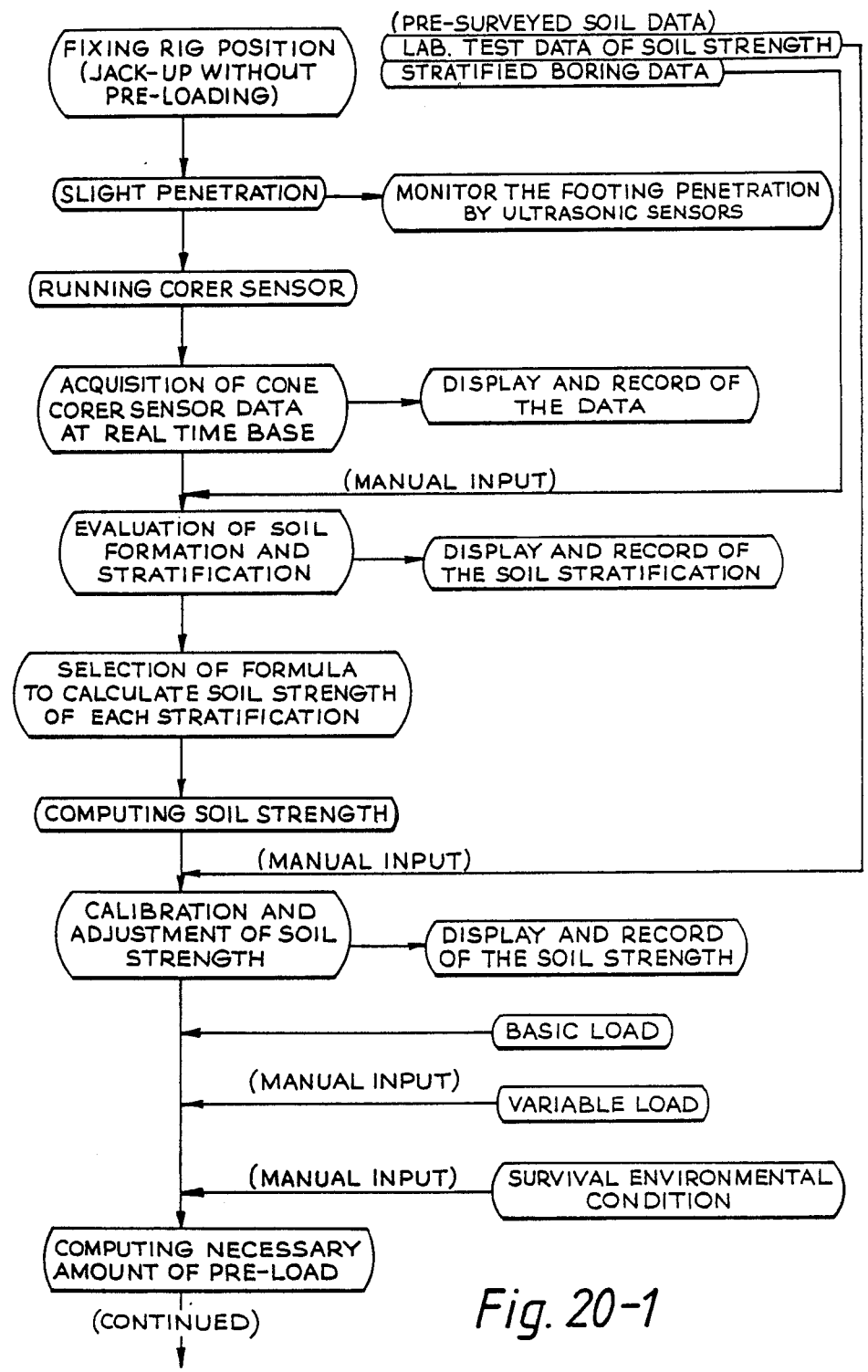
Figures 2, 20:
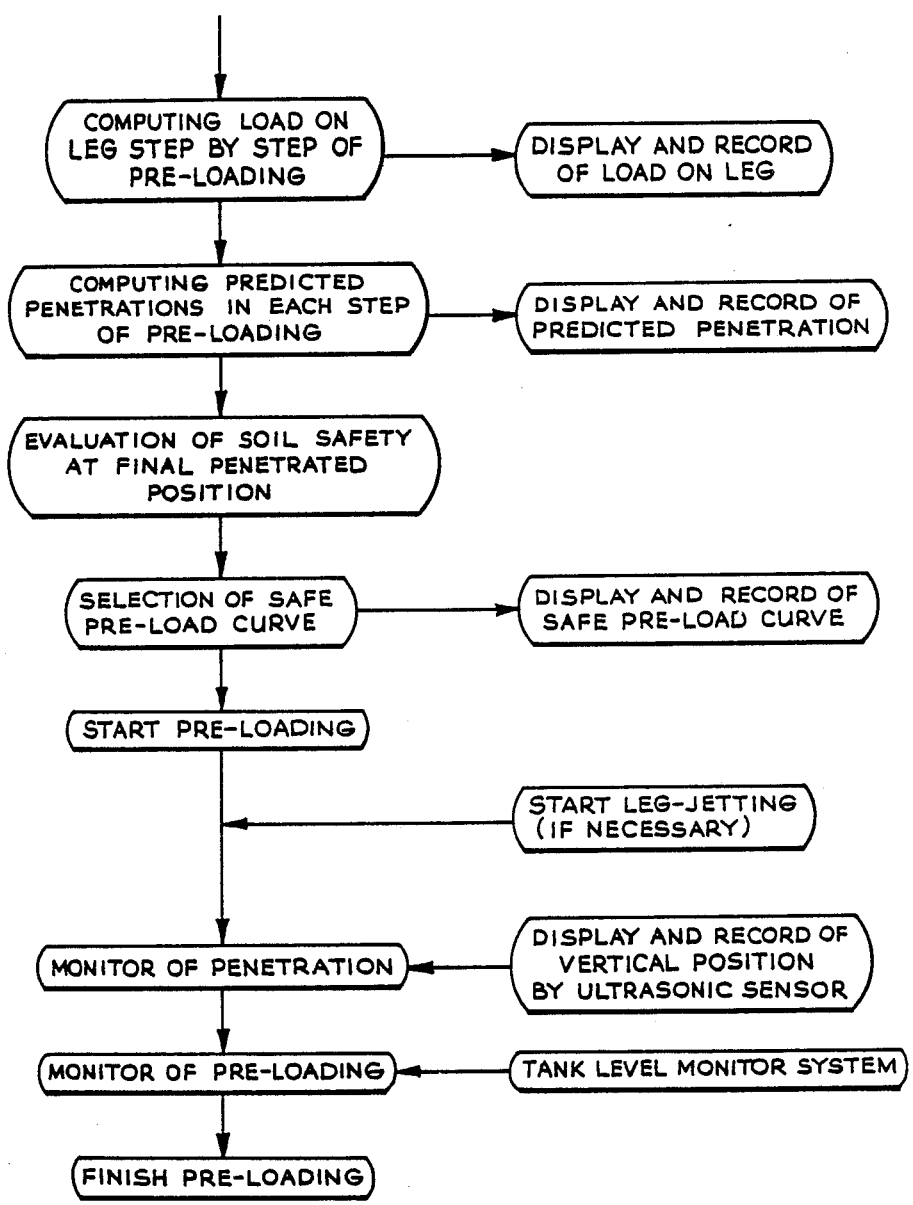
Figure 21:
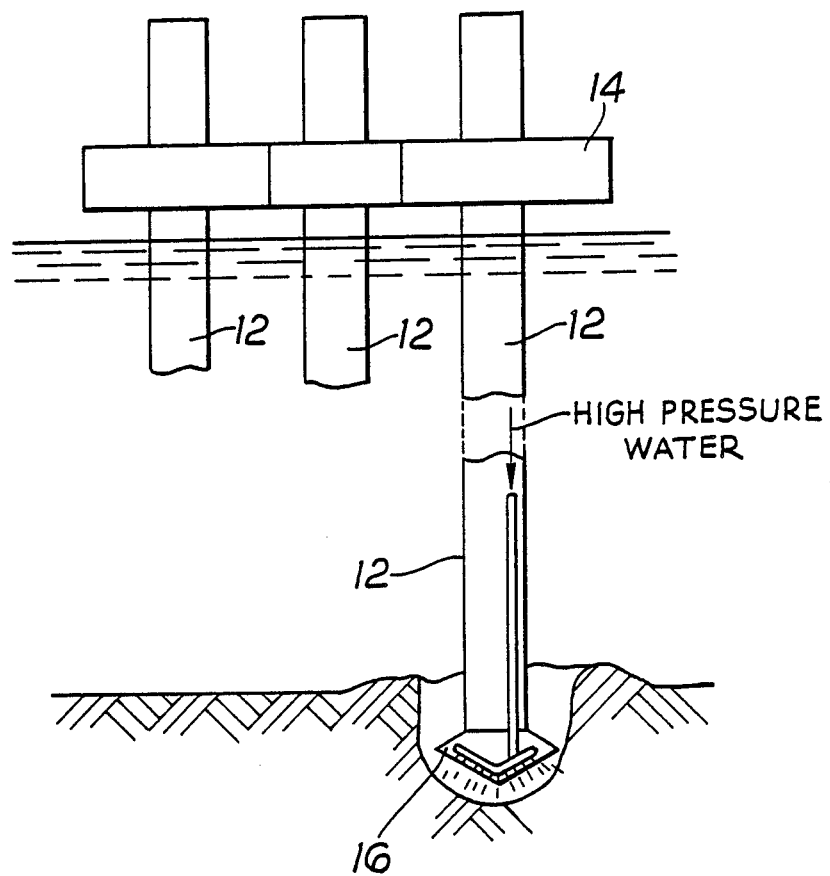
FIG. 21 is a schematic illustration of jet stream of water ejecting from the footing to provide facilities for expediting to penetrate the footing into the ground beneath the sea floor.

The various steps involved in the procedural aspects of the invention is as shown in a block diagram of FIG. 20 which illustrates certain sequential relations between the various procedural steps.

Figure 11:
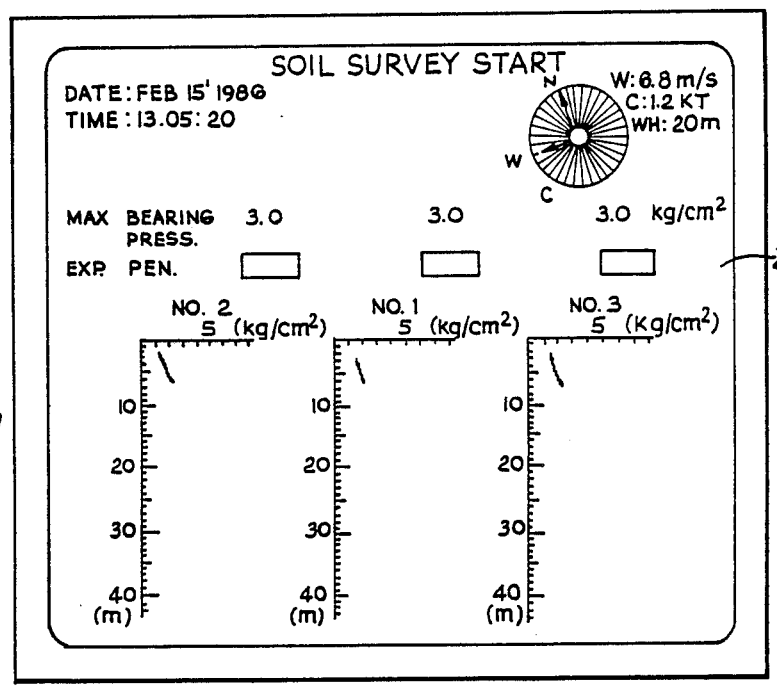
FIG. 11 is a schematic view of a picture displayed on a cathode-ray tube just when a soil survey is on the point of starting.

The jack-up rig 10 is towed to a desired offshore location, and then each leg 12 is driven a short distance into the ground below the ocean floor. Thus the information from the corer sensor 316 can be displayed on the cathode-ray tube 26 in picture, as shown in FIGS. 11 and 12 from the survey start to the survey finish.

Conditions of a stratum of the sea floor and structures of the ground can be obtained numerically and checked by means of the computer to decide the preload to be applied to the rig 10.

Figure 22:
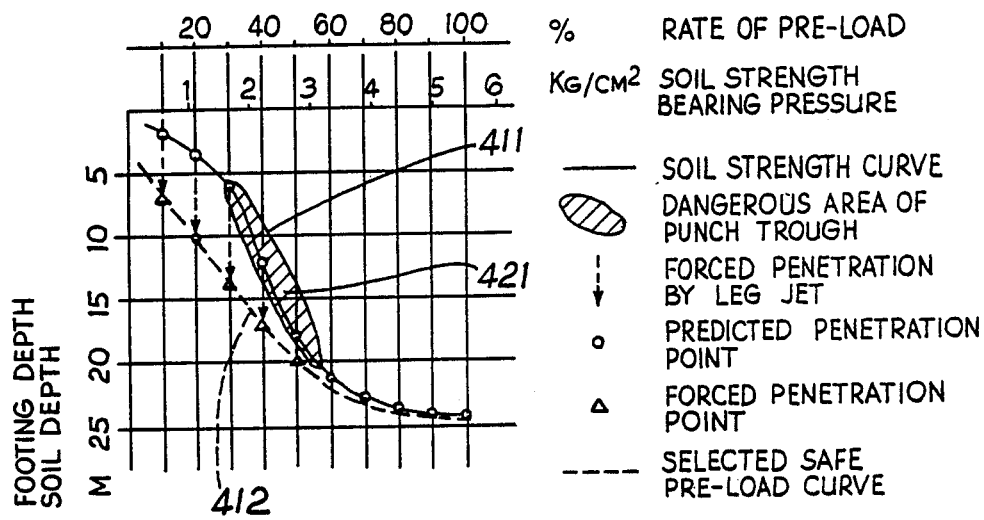
FIG. 22 and FIG. 23 are respectively a schematic graph showing the data obtained from the ground beneath the sea floor according to the method of the present invention.

In applying the preload to the leg 12, as shown in FIG. 22, water can be injected from nozzles provided to the footing 16 to facilitate for expediting to penetrate the footing 16 into the ground.

Figure 23:
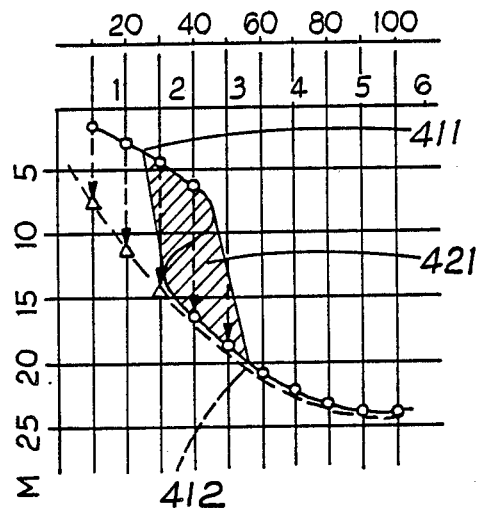

Referring to FIG. 22 and FIG. 23, the procedures for driving the leg 12 into the ground on the basis of data obtained according to the method of the invention will be described.

FIGS. 22 and 23 show an example of a picture displayed on the cathode-ray tube 26 in which the depth (m) of the ground below the ocean floor is expressed in ordinate and the rate of preload applied to the rig 10 is expressed in abscissa. As shown in each of FIG. 22 and FIG. 23, the solid line 411 is the soil strength curve calculated and indicated by the computor 330, the dotted line 412 is the safe preload curve selected by the computor 330, and the shadowed area shows the dangerous area where the punch-through accidents could occur during preload operation.

FIG. 22 shows an example of a picture in which a soft ground layer extends from 5 to 20 m where 40 to 60% preload could give a sudden penetration by 15 m. Therefore, by means of leg jet system, penetration must be expedited on along the dotted line 412 with less amount of preload, which will give the operator the safety preload operation. FIG. 23 shows an example of a picture in which a sand layer exists on a soft sea floor.

While the described embodiment represents the preferred form of the present invention, it is to be understood that modifications will occur to those skilled in the art without departing from the spirit of the invention. The scope of the invention is therefore to be determined solely by the appended claims.

What is claimed is:

1. A method for installing an offshore jack-up structure having a buoyant platform to be towed and a plurality of legs, the method comprising the steps of:
   (a) providing a pair of ultrasonic transmitter-receivers on a longitudinal and horizontal center line of the platform,
   (b) providing of ultrasonic transmitters on a longitudinal and horizontal center line of a target structure to which the rig is approached; and
   (c) receiving signals transmitted from the ultrasonic transmitters of the target structure by the ultrasonic transmitter-receivers of the platform to determine a relative distance between the rig and the target structure.

2. The method according to claim 1 in which the relative distance between the rig and target structure is displayed on cathode-ray tubes of computers.

3. The method according to claim 2 in which information for positioning the rig to the target structure is displayed on the cathode-ray tubes.

4. A method for installing an offshore jack-up rig having a buoyant platform and a plurality of legs, the method comprising the steps of:
  (a) providing a pair of ultrasonic transmitter-receivers on a longitudinal and horizontal center line of the rig;
  (b) providing of ultrasonic transmitters on a longitudinal and horizontal center line of a target structure to which the rig is approached;
  (c) providing a ultrasonic transmitter on a longitudinal and horizontal center line of the underside of the platform;
  (d) providing a ultrasonic receiver on a longitudinal and horizontal center line of the underside of the platform at right angle and adjacent to the ultrasonic transmitter;
  (e) calculating the distance between the rig and the target structure; and
  (f) obtaining information of the configuration of the sea floor directly under the platform by means of the ultrasonic transmitter and the ultrasonic receiver provided to the underside of the platform.

5. The method according to claim 4 in which the distance between the rig and the target structure and the configuration of the sea floor directly under the platform are displayed on the cathode-ray tubes.

6. A method for installing an offshore jack-up rig having a buoyant platform, a deck, a drill floor and a plurality of legs passing through the platform vertically and a footing provided to each of the legs, the method comprising the steps of:
  (a) providing a ultrasonic transmitter on the underside of the platform;
  (b) providing a ultrasonic receiver on the underside of the platform;
  (c) providing a corer sensor on the footing, the deck, the drill floor, the leg or the sea floor; and
  (d) displaying information transmitted from the transmitter and corer sensor on a cathode-ray tube.

7. A method for installing an offshore jack-up rig having a buoyant platform to be towed and a plurality of movabe legs passing through the platform vertically and a footing secured to each of the legs, the method comprising the steps of:
  (a) providing a first ultrasonic sensor on the underside of the platform adjacent to each of legs;
  (b) providing a submersible sensor on each of the legs for radiating pulses in water;
  (c) providing one or two submarine sensors to be laid on the sea floor, the sensor being thrown down from the platform into a body of water;
  (d) providing a first circuit connected with the first ultrasonic sensor and the submersible sensors for receiving pulses radiated from the submarine sensor in order to obtain a posiion coordinate of the submarine sensors in the water;
  (e) receiving pulses from the submarine sensor by means of the submersible sensor and determining the rate of movement of the leg in connection with the position coordinate in the first circuit;
  (f) providing a second circuit connected with the submersible sensor for receiving signals radiated from the submarine sensor after the footing is touched with the sea floor by means of the submersible sensor and determining the rate of subsidence of the leg per unit time in comparison of the radiated pulse with the received pulse in phase;
  (g) providing a third circuit connected with the first ultrasonic sensor for determining the level of the platform form the surface of a body of water by radiating pulse signals from the first sensor and receiving the signal reflected from the water surace when the platform is elevated above the surface of a body of water; and
  (h) displaying outputs from the first, second and third circuits on cathode-ray tubes.

8. The method according to claim 7 in which the first ultrasonic sensor is a ultrasonic transmitter-receiver.

9. The method according to claim 7 in which the determination of the rate of subsidence of the leg per unit time is carried out by comparing the pulse radiated from the submarine sensor with the pulse received by the submersible sensor in phase.

10. A method for installing an offshore jack-up rig having a buoyant platform and a plurality of legs, the method comprising th steps of:
  (a) calculating the strength of soil in the ground beneath the sea floor;
  (b) selecting preload to be applied to the leg on the basis of the strength of the soil; and
  (c) applying the selected preload to the leg.

11. A method for installing an offshore jack-up rig having a buoyant platform and a plurality of movable legs passing through the platform vertically, the method comprising the steps of:
  (a) positioning the buoyant platform to a desired offshore loation;
  (b) driving the leg a short distance into the ground beneath the sea floor;
  (c) penetrating a corer sensor into the ground for inspecting the condition of the soil in the ground;
  (d) collecting data applied to the corer sensor;
  (e) evaluating preload to be applied to the rig on the basis of the data obtained;
  (h) detecting a safety position in the ground beneath the sea floor for supporting the rig firmly;
  (i) applying preload to the rig so as to reach the lower end of the leg to the safety position in the ground;
  (j) monitoring the penetration of the leg; and
  (k) expediting the penetration of the leg into the safety strata avoiding the dangerous punch-through area by means of jet water system.

* * * * *